INVENTOR
JOHN R. FISHER

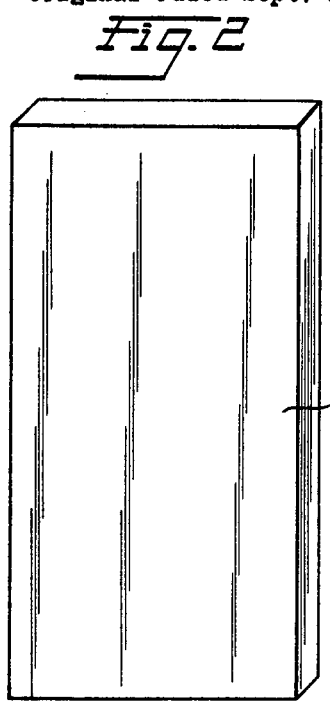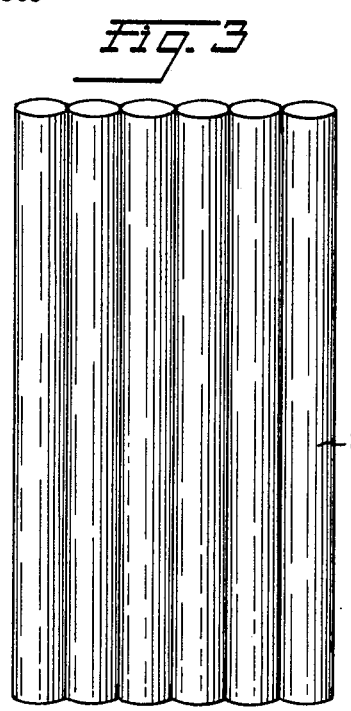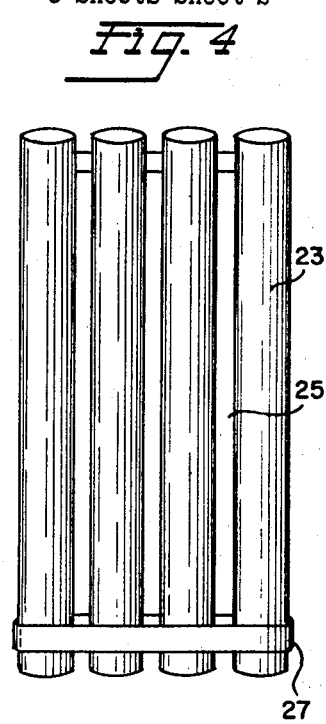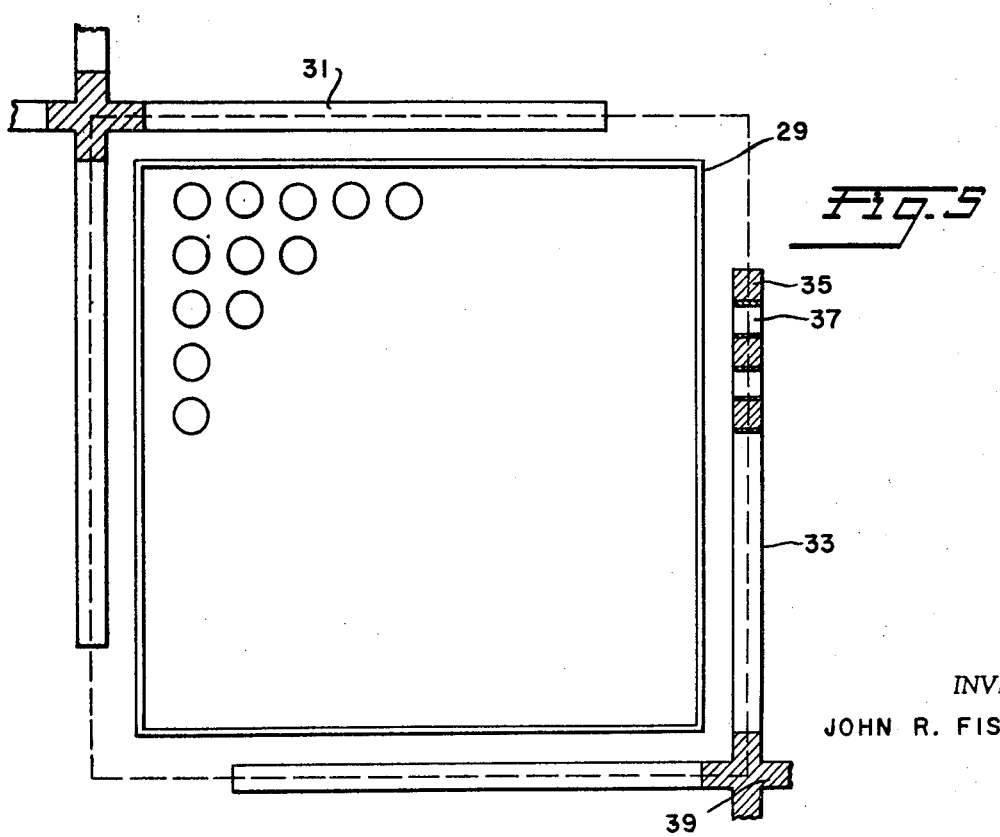

Jan. 23, 1973   J. R. FISHER   3,712,852
NUCLEAR REACTOR CONTROL ROD
Original Filed Sept. 2, 1966   6 Sheets-Sheet 3

INVENTOR
JOHN R. FISHER

Jan. 23, 1973   J. R. FISHER   3,712,852
NUCLEAR REACTOR CONTROL ROD
Original Filed Sept. 2, 1966   6 Sheets-Sheet 6
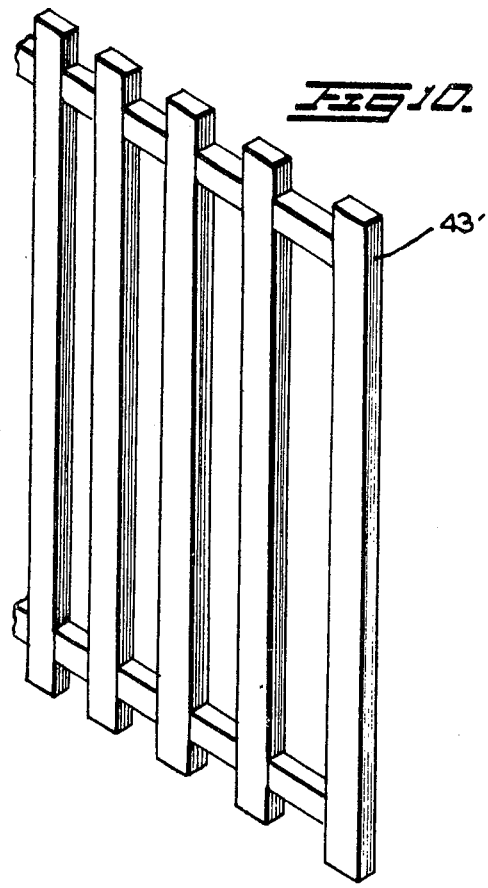
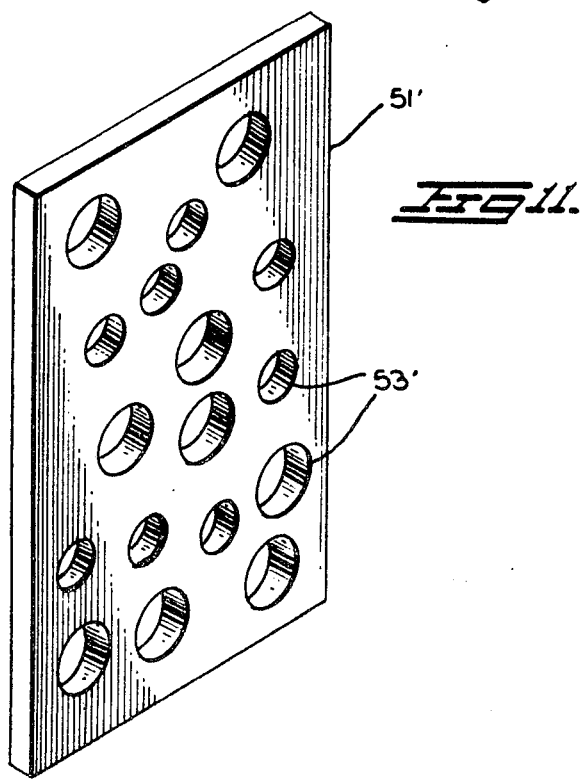
INVENTOR
JOHN R. FISHER

United States Patent Office 3,712,852
Patented Jan. 23, 1973

3,712,852
NUCLEAR REACTOR CONTROL ROD
John R. Fisher, 13019 Margot Drive,
Rockville, Md. 20853
Continuation of abandoned application Ser. No. 577,066, Sept. 2, 1966. This application July 8, 1968, Ser. No. 752,111
Int. Cl. G21c 7/10
U.S. Cl. 176—86                 2 Claims

ABSTRACT OF THE DISCLOSURE

A control rod (movable or fixed) for a water moderated nuclear reactor is comprised of a plurality of tubular, rectangular, or oval members which are coplanar and in parallel thus forming a blade or slab. The members are of a neutron absorbing material such as boron carbide, hafnium, silver-indium-cadmium, etc., and are spaced such that a neutron moderator as water or $D_2O$ can flow between the members, or a solid moderator such as zirconium hydride can be placed between the members. The spacing between members can be varied axially, can be varied from one end of the blade to the other, or both. In this manner the neutron absorption rate can be shaped along the blade. Said blades may form a cruciform, Y shape, or slab and may be the movable type which can be positioned by a drive or the fixed type which can only be positioned or removed manually.

Also, a control rod for a water moderated nuclear reactor is comprised of a solid blade of neutron absorber, such as hafnium, having cruciform, Y, slab shape, etc., either movable or fixed, with a series of bore holes which allow moderator to flow through the rod and thus providing neutron moderation within the rod.

---

This application is a continuation of U.S. patent application Ser. No. 577,066, filed Sept. 2, 1966 now abandoned.

This invention relates generally to control rods for nuclear reactors, and is particularly concerned with the shutdown control and the shaping of the power distributions in light water moderated reactors through the use of certain neutron absorber and moderator arrangements.

One of the design objectives of power reactors, for economic reasons in the commercial field and practical reasons in the military field, is very long fuel life, or high irradiation level (i.e., megawatt days per ton). This can result in a change in two characteristics which affect the control rods. The initial reactivity to be controlled can be larger and there can be an increase in the ratio of epi-thermal neutron flux. These conditions have led to an interest in control rod materials which are epi-thermal as well as thermal neutron absorbers, among which are boron carbide, silver-indium-cadmium alloy, boron in stainless steel, hafnium, and the rare earths, such as europium, dysprosium and samarium, with the objective of obtaining increased control rod worth.

The majority of the light water moderated power reactors that have been built, or are being built, control the reactivity by movable blades, such as slab, cruciforms, Y-shape configurations, etc., and by removable shims which are also blades or slabs of some type. These blades are generally made of solid neutron absorber materials such as the above-mentioned boron-stainless steel, hafnium, silver-indium-cadmium, etc., or the neutron absorber is put into steel tubes and the blade is formed by arranging these absorber elements side by side. The control blades are arranged in the reactor between fuel elements with the chain reaction being regulated by insertion or withdrawal of these control rods. In the case of removable shims, they are placed between or within a fuel element and are removed, replaced or repositioned during regularly scheduled shutdown intervals. The descriptive words "control rods" are hereafter used to refer to these stationary shims as well as movable blades.

It is an object of the present invention to provide a control rod design which is less expensive to manufacture, uses considerably less neutron absorber material, improves the operating characteristics of the boiling water type reactor, and allows a wider choice of neutron absorber materials for use in control rods.

These and other objects will become apparent from the following description taken in conjunction with the drawings wherein:

FIGS. 2 and 3 are elevational views of conventional solid slab and absorber element array configurations;

FIG. 4 is an elevational view of one type of spaced absorber elements configuration included in the present invention;

FIG. 5 is a partial schematic cross-sectional view of a typical fuel assembly and associated control rods;

FIG. 10 is a partial view of variably spaced absorber elements similar to FIG. 7; and FIG. 11, is a perspective view of a neutron absorbing rod means similar to FIG. 9 with variably spaced boreholes.

Figure 1:
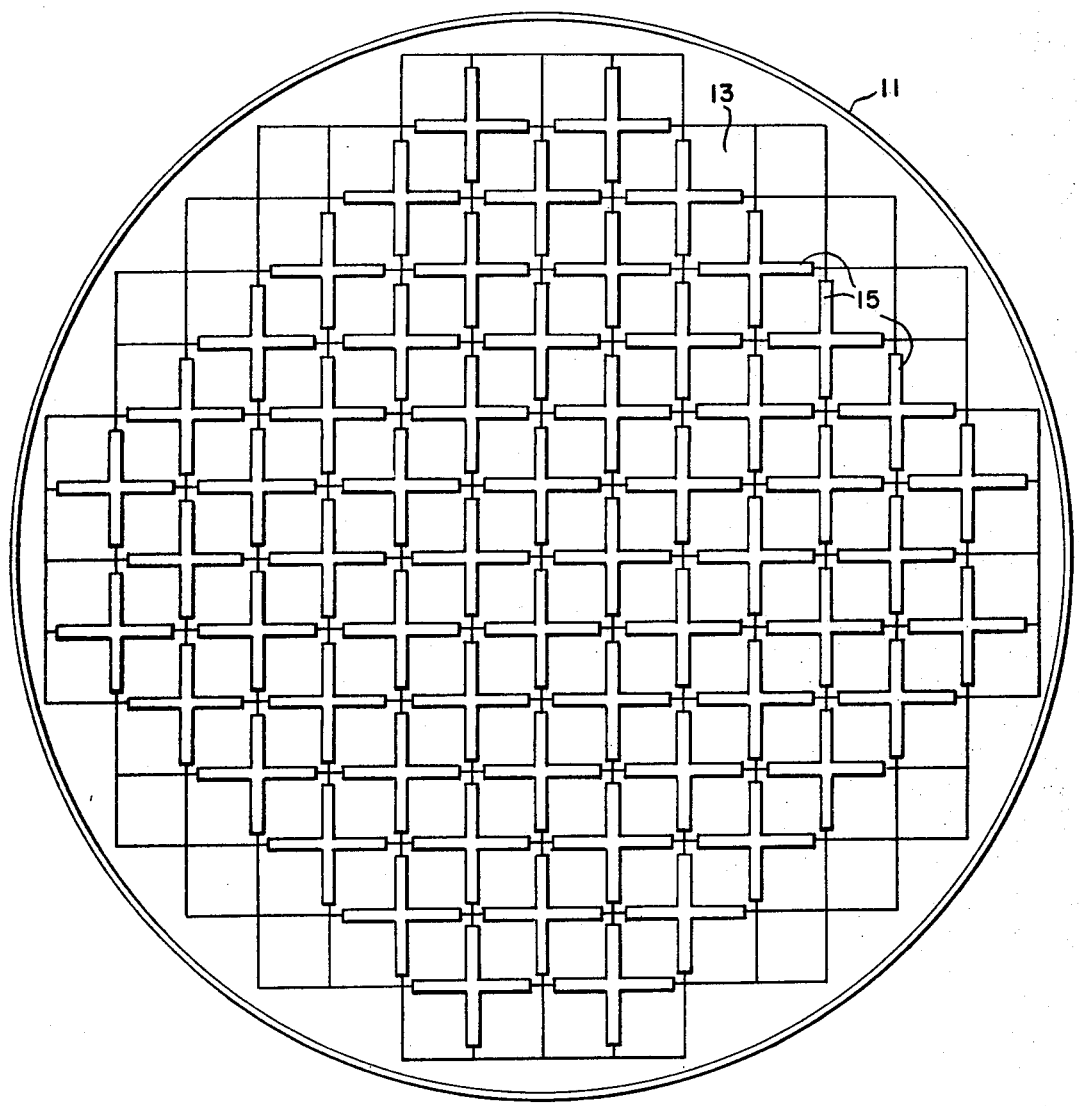
FIG. 1 is a plan view of a standard control rod arrangement in a light water moderated power reactor.

Turning now more particularly to the drawings, FIG. 1 is a plan view of a typical water reactor in a vessel 11, having a plurality of fuel assemblies 13 and associated control rods 15.

FIGS. 2 and 3 disclose typical absorber blades used in constructing control rods. Absorber blade 19 is a solid slab of material while the absorber blade of FIG. 3 is a series of adjacent tubes having the neutron absorbing material enclosed therein.

Figure 6:
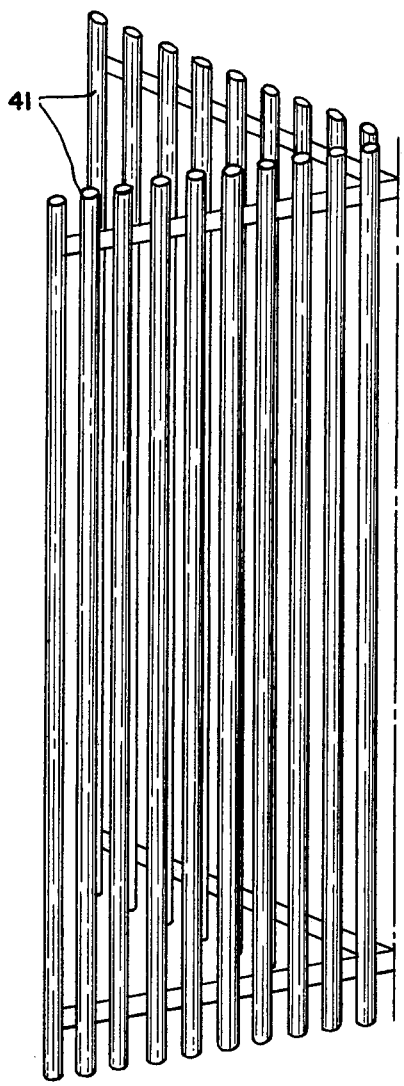
FIGS. 6 and 7 are partial elevational views of control rods using differently shaped absorber elements.
Figure 7:
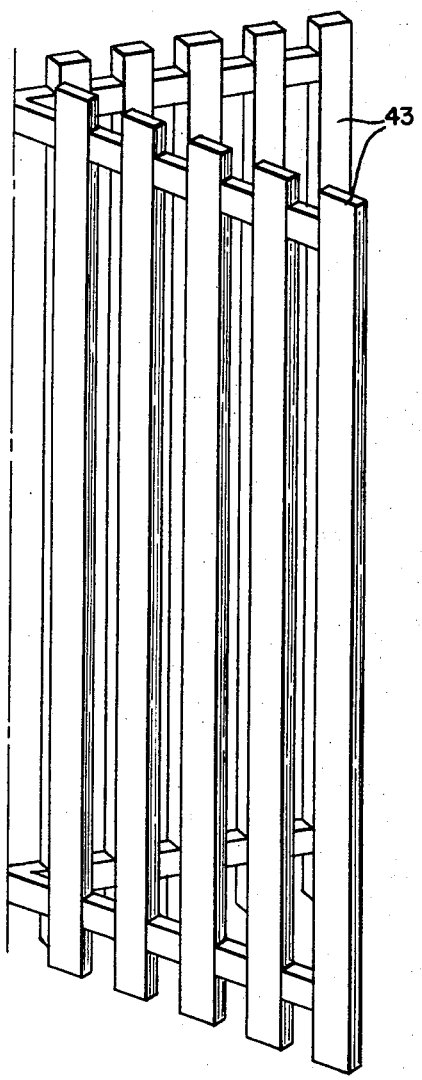

The blades of the new control rod as shown in FIG. 4 may be formed by a linear array of spaced neutron absorbing elements 23. The space 25 between the elements is occupied by a neutron moderator, which in a light water type reactor could be water. The elements may be maintained in a spaced configuration in any manner such as metal strap 27, or spaced pieces such as shown in FIGS. 6 and 7.

FIG. 5 is an expanded view showing a specific fuel assembly 29 and associated cruciforms 31 and 33. Cruciform 33 is shown sectionally to illustrate absorber elements 35 separated by gaps 37 of a neutron moderator such as water. The structure may be supported by means such as steel members 39.

For purposes of explanation and illustration, the cruciform geometry as shown in FIG. 1 is used, but the rod can be of other shapes, such as Y-shape, slab or an annulus. FIGS. 6 and 7 are illustrations of a part of a cruciform control rod utilizing the principle of this invention with different geometrically shaped absorber elements such as cylindrical elements 41 and rectangular elements 43.

The elements themselves can be stainless steel tubes filled with a neutron absorber or can be an unclad neutron absorber depending upon the particular absorber material selected and the form in which it is to be used. For example, stainless steel tubes could be filled with boron carbide, a rare earth oxide, silver-indium-cadmium or any other neutron absorber, or elements of an absorber material such as hafnium without cladding could be used. The descriptive word "elements" is not limited to cylindrical shapes but is meant to refer to oval geometries, square or rectangle geometries, or any geometric shape that can utilize the concept of spacing. It should also be noted that spacing could be accomplished by the use of empty hollow tubes, ovals, rectangles, etc., between absorber elements.

The spacing between the elements in the blade need not be constant, either from top to bottom or from the center of the cruciform to the outside edge. By varying the spacing between the elements in the latter manner, such as shown in FIG. 10, the neutron absorption along the blade is regulated so that a more efficient use of the absorber material is obtained. The advantages of varying the spacing from top to bottom are discussed hereinafter.

The use of a moderator with absorber elements is not limited to liquid moderators between the elements. The same effects can be accomplished by use of a solid moderator, such as, but not limited to, zirconium-hydride or beryllium between the elements. Also, mixing the absorber and a solid highly moderating material together in the elements or in a solid slab, or perforating the absorber blade such that moderator can flow through the blade, or any similar type procedure will lead to similar results.

The particular concern in the control of a reactor is the capability of shutting down a reactor in the so-called "one rod out" or "stuck rod" condition, whereby the reactor must remain subcritical with the most reactive rod withdrawn. Experimental and analytical results show that, by spacing the absorber as described above, a significant reduction in absorber material can be realized for at most a small decrease in the control capability in the stuck rod condition. As a typical example, for a large water reactor, a 45% reduction in the absorber material can be realized by spacing with a reduction of only a few tenths of one percent in the shutdown capability.

The reason for the above result relates to the fact that neutrons which impinge upon solid type control rods used in most water reactors have energies ranging from thermal (up to a few tenths of an ev.) to fast (in the mev. range). The materials commonly used for control rods absorb virtually all the thermal neutrons which strike the rod and also absorb some percentage of the epi-thermal (few tenths to few thousand ev.) neutrons. The actual percentage of the epi-thermal neutrons absorbed varies depending upon the material used and the thickness of the rod. Making a control rod with the moderator between the absorber tubes decreases the percentage of epi-thermal neutron absorptions and increases the thermal absorptions by the rod. A significant number of epi-thermal neutrons impinging upon the spaced absorber rod are slowed to thermal energies by the moderator between the absorber and therefore the probability of their capture by the rod is increased. This increase in the number or thermal neutrons absorbed by the rod due to the increased thermal neutron density in the vicinity of the rod compensates for the decrease in epi-thermal neutron absorption caused by the decrease in the epi-thermal absorber material, i.e., the control rod material, and the net result is little change in the shutdown capability.

Experiments substantiating the above statements were performed using a material having high potential for epi-thermal neutron absorption due to large absorption resources, which is representative of any resonance absorber considered for control rod use, and using a material with a smoothly varying epi-thermal cross section, which typifies this type of absorber. The described relationship between spacing and reactivity worth with a moderator separating the elements was observed with both types of absorber material.

The effect of spacing the absorber elements insofar as the change in reactivity worth of the rod is concerned is dependent upon the size of the element, the type, density and amount of moderator between the elements, the neutron spectrum of the reactor of interest, and the absorber material being used for the control rod. For each reactor one or more of these items is usually fixed, and the remaining variable may be adjusted to obtain the optimum arrangement for the reactor of interest. The absorber material, spacing and the absorber size (i.e., density and geometry) can be selected so as to fit the requirements and objectives of the particular eractor.

This dependence can also be utilized to shape or flatten the axial power distributions in a boiling water type reactor. In this type of reactor water enters the bottom of the reactor and is heated to steam as it flows upward through the fuel elements. The steam fraction of the coolant is very small in the bottom sections of the reactor, is larger in the middle, and in some fuel assemblies is greater than half the coolant volume at the top of the reactor. The decrease in coolant density, which is also a decrease in moderator density, can cause the power produced to peak towards the bottom of the reactor core and can lead to severe power distortions, especially with top entry control rods. To counteract this, the current design practice is to provide control rods which enter from the bottom of the reactor. These bottom entry rods, when selectively inserted into the lower sections of the reactor, tend to offset the effect of steam voids in the top section of the reactor and the net effect is a flattening, or reduction in the peak to average power, of the axial power distribution. However, these bottom entry rods present design complications and operating limitations which are not present with top entry rods.

Figure 8:
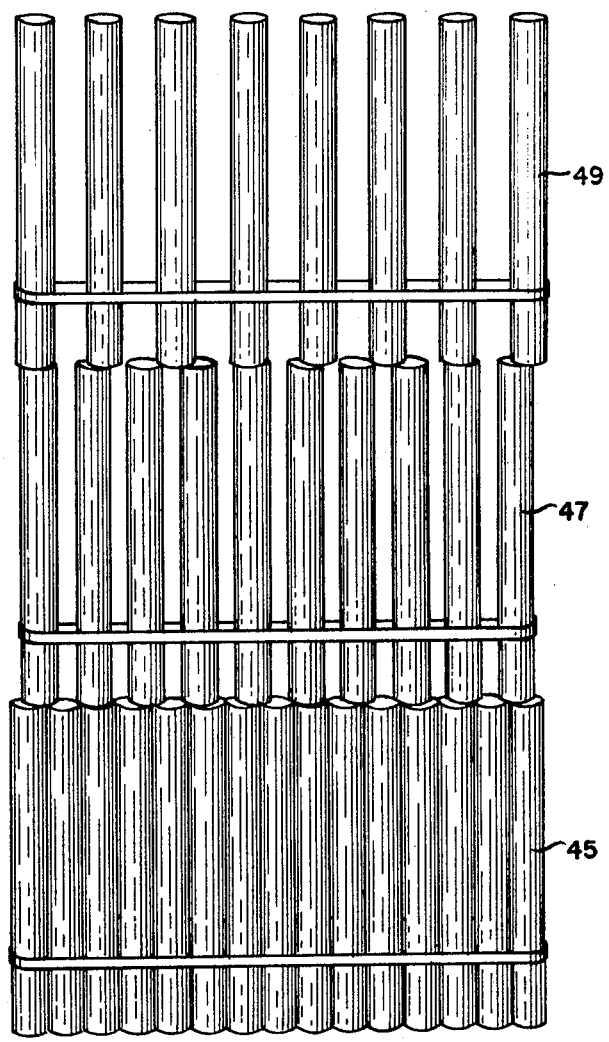
FIG. 8 is an elevational view of a series of absorber elements arranged for particular power distribution control.

The spaced absorber concept for control rods can be used to shape or flatten the axial power distribution. The worth of a spaced absorber rod is dependent upon the size of the absorber element and upon the amount of moderator between the tubes. In boiling water reactor the coolant flow in the control rod channels can be regulated so as to cause boiling in the channel and between the absorber elements. By proper selection of the element spacing, the reactivity worth of the control rod can, because of this steam void, be made to vary with height such that the reactivity worth of the part of the rod in the top section of the core is less than that in the bottom section. The net effect is that more negative reactivity is added to the bottom section of the core, which tends to counteract the steam void effect and flattens the power distribution. This variation of reactivity worth as a function of height can be further increased by using a closer packed array of elements in the bottom section of the blade and a spaced array of the same diameter elements in the upper sections of the rod. Such a configuration is illustrated schematically in FIG. 8 with a group of adjacent elements 45 supporting elements 47 slightly spaced and upper elements 49 having a large spacing.

A further consequence of this power flattening aspect is that it increases the desirability of using top entry rods in boiling water reactors.

This variation of reactivity worth as a function of rod height for constant size elements, due to the moderator density change between the tubes, occurs in the reactor when power is being generated. There is no variation in reactivity worth of the rod as a function of height in the case when the moderator is not boiling and hence the shutdown margin is not effected. In the case where the reactivity worth of the rod versus height of the rod is varied by the use of the stepped spaced elements, or different spacings of the elements, the element size and spacings can be chosen such that there is little variation in the blade worth when the moderator is at or near 20° C.

It will now be evident that the present invention provides a number of advantages over standard control rods.

First, less absorber material is needed. Not only is this an economic gain, but the control rods themselves are lighter which is a design advantage.

Also, the rods of the present invention are less expensive to manufacture. In addition to less material, there is handling and less welding in the case where the absorber is put in tubes.

Further, a wider choice of absorber materials is available. The decrease in material costs provides the possibility of the use of the more expensive, but longer lasting, materials such as europium, hafnium, silver-indium-cadmium, etc. The decrease of emphasis on epi-thermal absorption enhances the possibility of using absorber materials with less desirable epi-thermal characteristics, such as gadolinium and samarium mixtures, which are relatively inexpensive.

Additionally, improved operating characteristics are obtained. The spaced absorber control rods offer the opportunity for power flattening in boiling water reactors and the possibility of downward scramming rods without the disadvantages usually associated with downward scram in boiling water reactors.

It will be obvious that a control rod such as shown in FIG. 7 could be constructed by removing material from a solid slab so as to form a rod having unclad elements with the material itself providing the cross-support structure.

Figure 9:
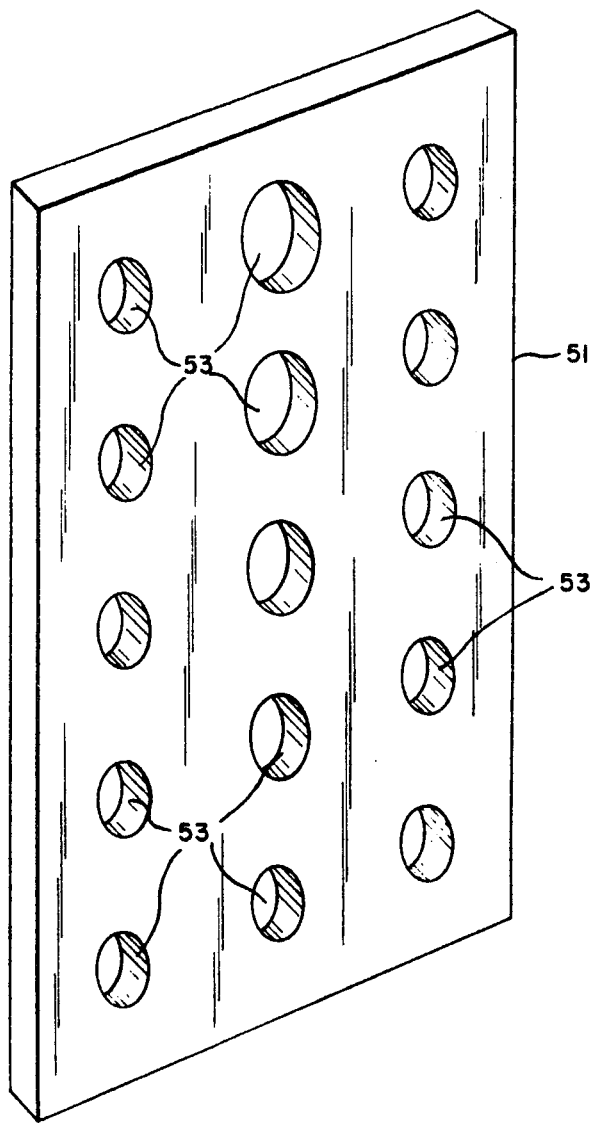
FIG. 9 is a perspective view of another type of neutron absorbing rod means included in the present invention.

Another embodiment of this same principle is shown in FIGS. 9 and 11 wherein solid slabs 51 and 51' of absorber material contains a series of variably spaced boreholes 53, 53' therethrough. The moderator, therefore, is present in the boreholes and the structure is functionally equivalent to the spaced elements previously discussed.

It is to be understood that the above description and associated drawings are to be considered as illustrative only and the invention is to be limited only by the scope of the following claims.

I claim:
1. In a water moderated nuclear reactor a control rod comprising,
a plurality of interconnected geometrically shaped neutron absorber elements which are coplanar and in parallel so as to form blades, said elements being of a neutron absorbing material, and
means for variably spacing said elements for allowing a predetermined volume of moderator to pass therethrough, the space between said elements being devoid of structural material,
said spacing between said elements progressively increasing from one edge of said blade to the other edge thereof.
2. In a water moderated nuclear reactor a control rod comprising,
a plurality of interconnected sets of interconnected geometrically shaped neutron absorber elements which are coplanar, said sets of absorber elements being vertically stacked so as to form a blade, and
means in each of said sets for variably spacing said elements for allowing a predetermined volume of moderator to pass therethrough, the space between said elements being devoid of structural material,
the spacing between said elements in each of said sets progressively increasing from the lower of said sets to the upper of said sets.

References Cited

UNITED STATES PATENTS

| | | | |
|---|---|---|---|
| 2,947,678 | 8/1960 | Gimera et al. | 176—75 |
| 3,049,484 | 8/1962 | Zinn | 176—75 X |
| 3,141,227 | 7/1964 | Klepfer et al. | 176—86 X |
| 3,255,086 | 6/1966 | Hitchcock | 176—86 X |
| 3,309,118 | 3/1967 | Anthony | 176—86 X |
| 3,314,859 | 4/1967 | Anthony | 176—86 X |

LELAND A. SEBASTIAN, Primary Examiner

H. E. BEHREND, Assistant Examiner